United States Patent
Gerrick

(10) Patent No.: US 10,708,292 B2
(45) Date of Patent: Jul. 7, 2020

(54) VULNERABILITY CONTEXTUALIZATION

(71) Applicant: Aetna Inc., Hartford, CT (US)

(72) Inventor: Ryan Gerrick, Coventry, CT (US)

(73) Assignee: Aetna Inc., Hartford, CT (US)

( * ) Notice: Subject to any disclaimer, the term of this patent is extended or adjusted under 35 U.S.C. 154(b) by 241 days.

(21) Appl. No.: 15/824,491

(22) Filed: Nov. 28, 2017

(65) Prior Publication Data
US 2019/0166149 A1    May 30, 2019

(51) Int. Cl.
| | | |
|---|---|---|
| H04L 29/06 | (2006.01) | |
| G06F 21/57 | (2013.01) | |
| G06T 11/20 | (2006.01) | |
| G06Q 10/10 | (2012.01) | |
| G06F 16/24 | (2019.01) | |

(52) U.S. Cl.
CPC .......... *H04L 63/1433* (2013.01); *G06F 16/24* (2019.01); *G06F 21/577* (2013.01); *G06Q 10/10* (2013.01); *G06T 11/206* (2013.01)

(58) Field of Classification Search
CPC ... H04L 63/1433; G06F 21/577; G06Q 10/10; G06T 11/206
See application file for complete search history.

(56) References Cited

U.S. PATENT DOCUMENTS

| | | | | |
|---|---|---|---|---|
| 9,692,778 | B1 * | 6/2017 | Mohanty | .................. G06F 21/50 |
| 9,853,994 | B2 * | 12/2017 | Sakakibara | .............. G06F 11/34 |
| 2006/0265324 | A1 * | 11/2006 | Leclerc | .................. G06F 21/577 |
| | | | | 705/38 |
| 2007/0067846 | A1 * | 3/2007 | McFarlane | ............ G06F 21/577 |
| | | | | 726/25 |
| 2013/0104236 | A1 * | 4/2013 | Ray | ...................... H04L 63/1433 |
| | | | | 726/25 |

(Continued)

OTHER PUBLICATIONS

Berg, Al, "Four Steps to Sound Security Vulnerability Management," http://searchsecurity.techtarget.com/feature/Four-steps-to-sound-security-vulnerability-management?vgnextlmt=print (Feb. 1, 2002).

(Continued)

*Primary Examiner* — Yonas A Bayou
(74) *Attorney, Agent, or Firm* — Leydig, Voit & Mayer, Ltd.

(57) ABSTRACT

An embodiment of the disclosure provides a method for contextualizing vulnerabilities. The method is performed by a server including a processor and a non-transitory computer-readable medium with computer-executable instructions stored thereon, such that when the instructions are executed by the processor, the server performs the method including: (a) importing raw vulnerability data from a vulnerability scanner, the raw vulnerability data including one or more vulnerability data wherein each vulnerability data includes a vulnerability identification (ID) and an asset value; (b) importing an asset inventory from an asset database; (c) merging the asset inventory and the raw vulnerability data to obtain contextual vulnerability data, the contextual vulnerability data including one or more vulnerability data linked to a vulnerability ID, an asset value, and an asset owner; (d) categorizing the contextual vulnerability data; and (e) generating a report of the categorized contextual vulnerability data.

18 Claims, 10 Drawing Sheets

(56) References Cited

U.S. PATENT DOCUMENTS

| | | | | |
|---|---|---|---|---|
| 2013/0167238 A1* | 6/2013 | Russell | ............... | G06F 21/577 726/25 |
| 2013/0340086 A1* | 12/2013 | Blom | ............... | G06F 21/6245 726/26 |
| 2014/0047545 A1* | 2/2014 | Sidagni | ............... | G06F 21/577 726/25 |
| 2014/0047546 A1* | 2/2014 | Sidagni | ............... | G06F 21/577 726/25 |
| 2014/0082733 A1* | 3/2014 | Benefield | ............. | G06F 21/577 726/25 |
| 2014/0337974 A1* | 11/2014 | Joshi | ................ | H04L 63/1425 726/23 |
| 2014/0366145 A1* | 12/2014 | Benefield | ............. | G06F 21/577 726/25 |
| 2015/0106867 A1* | 4/2015 | Liang | ............... | H04L 63/1433 726/1 |

OTHER PUBLICATIONS

Butler, Chag, "Vulnerability Remediation," The SANS Institute (2014).
Cohen, Gidi, "Best Practice for Vulnerability Management," http://insights.wired.com/profiles/blogs/best-practices-for-vulnerability-management (Mar. 5, 2014).
Kurtz, George "Vulnerability Management for the Read World," Slideshow, 42 pages (2017).
Sidagni, Mchelangelo, "Three Key Challenges in Vulnerability Risk Management," *Network World* (Sep. 4, 2015).

* cited by examiner

FIG. 9

VULNERABILITY CONTEXTUALIZATION

BACKGROUND

Computer security, or in general, cyber security is a growing industry due to the prevalence of computers, smartphones, servers, and other computing devices being connected to the internet in growing numbers. Cyber security deals with protecting computing systems and infrastructure from virtual information theft and/or damage to computer software or hardware. Improvement in cyber security mitigates disruption or misdirection of services provided by a computing infrastructure/system.

Organizations utilize cyber security to protect against harm that may come via network access, data and code injection, whether intentional or accidental. With the explosion of ways of harming an organization's business through hacking, code injection, or some other means, cyber security should continually evolve to counter newly developed threats. An assessment of an organization's vulnerability to cyber security threats may be valuable to its continued business growth and success.

An organization's vulnerability to cyber security threat is difficult to manage even after vulnerabilities are identified due to a large number of vulnerabilities that exist. A great amount of labor and manpower may be required to understand the identified vulnerabilities or even select highly critical vulnerabilities.

BRIEF SUMMARY

An embodiment of the disclosure provides a method for contextualizing vulnerabilities. The method is performed by a server, including a processor and a non-transitory computer-readable medium with computer-executable instructions stored thereon, such that, when the instructions are executed by the processor, the server performs the method including: (a) importing raw vulnerability data from a vulnerability scanner, the raw vulnerability data including one or more vulnerability data, wherein each vulnerability data includes a vulnerability identification (ID) and an asset value; (b) importing an asset inventory from an asset database; (c) merging the asset inventory and the raw vulnerability data to obtain contextual vulnerability data, the contextual vulnerability data, including one or more vulnerability data linked to a vulnerability ID, an asset value, and an asset owner; (d) categorizing the contextual vulnerability data; and (e) generating a report of the categorized contextual vulnerability data.

Another embodiment of the disclosure provides a server for contextualizing vulnerabilities, the server comprising a processor and a non-transitory computer-readable medium containing instructions stored thereon, such that, when the instructions are executed by the processor, the server performs the method, including: (a) importing raw vulnerability data from a vulnerability scanner, the raw vulnerability data comprising one or more vulnerability data, wherein each vulnerability data comprises a vulnerability identification (ID) and an asset value; (b) importing an asset inventory from an asset database; (c) merging the asset inventory and the raw vulnerability data to obtain contextual vulnerability data, the contextual vulnerability data comprising one or more vulnerability data linked to a vulnerability ID, an asset value, and an asset owner; (d) categorizing the contextual vulnerability data; and (e) generating a report of the categorized contextual vulnerability data.

Another embodiment of the disclosure provides a computing device for displaying contextualized vulnerabilities, the computing device including a screen, a processor and a non-transitory computer readable medium containing instructions stored thereon, such that when the instructions are executed by the processor, the computing device performs the method including: (a) receiving, from a server, a message containing one or more vulnerability data and one or more solutions to the vulnerability data, each vulnerability data including a vulnerability identification (ID) and an asset value identifying an application; (b) determining whether a first one of the solutions for a corresponding vulnerability in the vulnerability data causes the application identified in the asset value of the corresponding vulnerability to break; (c) based on determining that the application breaks, generating an exception for the corresponding vulnerability and providing the exception to the server; (d) based on determining that the application does not break, applying the first solution to the application to patch the corresponding vulnerability; (e) receiving, from the server, a report of categorized contextual vulnerability data including the corresponding vulnerability being categorized in an exception category or in a fixed category; and (f) displaying the report on the screen.

BRIEF DESCRIPTION OF THE SEVERAL VIEWS OF THE DRAWINGS

FIG. 9 is another example report displayed on a screen of a computing device according to an embodiment of the disclosure.

DETAILED DESCRIPTION

Vulnerability scanners detect risks to the environment by evaluating individual assets against a catalog of vulnerabilities. Conventional cyber security vulnerability scanning solutions map vulnerabilities to the assets book of record (BOR) and generate tickets based on the mappings. These conventional solutions are unable to translate cyber security threats into actionable data, which in turn forces threat analysts to manually and unreliably attempt to map vulnerabilities to action plans. The conventional solutions also do not identify which security vulnerabilities are actively being addressed by existing automations, nor do they map vulnerabilities to exception BORs. The conventional solutions return a comprehensive list of potential vulnerabilities per asset, but lack the ability to prioritize remediation efforts, since they are unable to natively map threats with technology system management BORs. Without the ability to thread vulnerability output into existing computing infrastructure fabric, conventional solutions are unable to determine the threat to the computing environment. This is problematic, since the cyber threat landscape changes daily, and the ability to keep track of both assets and threats is becoming intractable.

Embodiments of the disclosure provide a system and method to contextualize vulnerabilities, thus enabling data engineers to prioritize, address, and remediate vulnerabilities in a significantly more reliable and rapid fashion. With the reduction in response time, instant interpretation of risk is realized, thus reducing costs associated with manual identification, and increasing accuracy by removing human error during the manual identification in conventional solutions. With the potential impact of a cyber security breach, an organization may utilize some embodiments of the disclosure to instantly understand their threat exposure and take immediate action to drastically reduce risk to their computing infrastructure.

Embodiments of the disclosure provide a system and method for contextualizing vulnerability raw data into information that can identify and prioritize vulnerability remediation. The embodiments provide an automation framework that may add meaning to unstructured cyber security vulnerability scan data. The embodiments utilize a programmatic workflow to map each vulnerability against asset inventories, deployment solutions, and risk management controls. This integration allows for conclusive and instant assessment of risk and prioritization of threat remediation.

Figure 1:
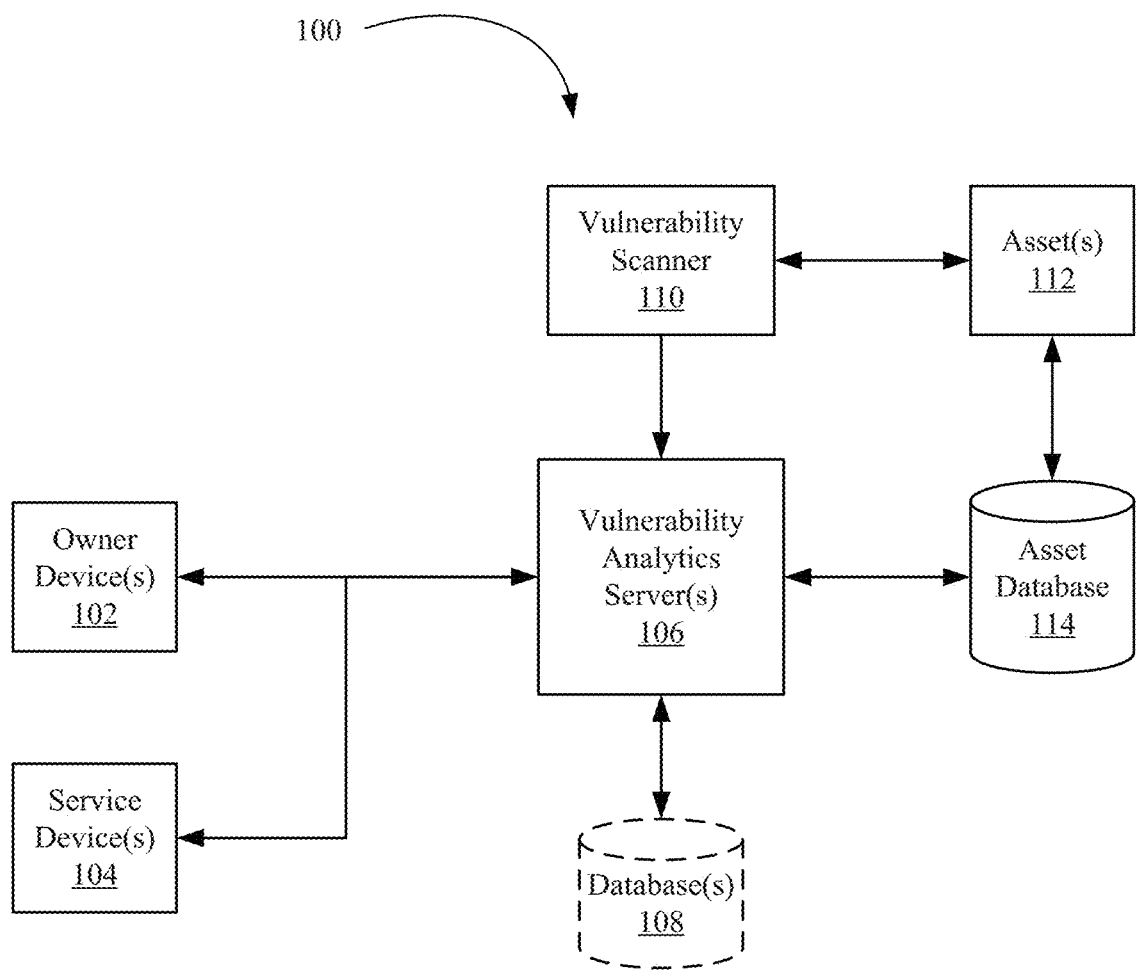
FIG. 1 illustrates a system for vulnerability analysis according to an embodiment of the disclosure.

FIG. 1 illustrates a system 100 for vulnerability analysis according to an embodiment of the disclosure. The system 100 may include one or more devices belonging to an asset, an application, or thread owner (owner device(s) 102), one or more devices belonging to a cyber security expert or service technician (service device(s) 104), one or more servers for performing vulnerability analysis (vulnerability analytics server(s) 106), one or more databases for information storage and retrieval (database(s) 108), one or more vulnerability scanning tools for scanning asset vulnerabilities (vulnerability scanner 110), one or more assets 112, and one or more asset databases 114 containing information on the assets 112.

The owner device(s) 102 and the service device(s) 104 are computing devices used by an individual. For ease of description, the singular form will be used for the owner device(s) 102 and the service device(s) 104 by default and plural form will be used when appropriate. Example computing devices for the owner device 102 and service device 104 include mobile devices, for example, a smartphone, a tablet, a phablet, a smart watch, a fitness tracking device, and so on. Computing devices may also include larger devices, for example, a smart television, a laptop computer, a desktop computer, and so on.

The vulnerability analytics server(s) 106 is a computing infrastructure with one or more servers utilizing one or more database(s) 108 for performing vulnerability analysis of assets 112. The vulnerability analytics server(s) 106 analyzes vulnerability data, informs the owner device 102 and/or the service device 104 of vulnerabilities, automates a remediation process, and generates reports of vulnerabilities associated with the assets 112. The vulnerability data is determined by the vulnerability scanner 110, which is a third-party tool that scans assets 112 for various vulnerabilities and packages these vulnerabilities as raw vulnerability data sent to the vulnerability analytics server(s) 106. The vulnerability scanner 110 may be software running on a computing device, such as, a laptop computer, a desktop computer, a server, etc.

The assets 112 include an organization's computing infrastructure that is being analyzed by the vulnerability analytics server(s) 106 for security vulnerabilities. Assets 112 include networking infrastructure, networking switches, firewalls, applications, servers, computers, laptops, operating systems, etc. Information on assets 112 may be stored in the asset database 114. Information on assets 112 may include the type of asset, owner of the asset, specific application utilizing the asset, etc.

Figure 2:
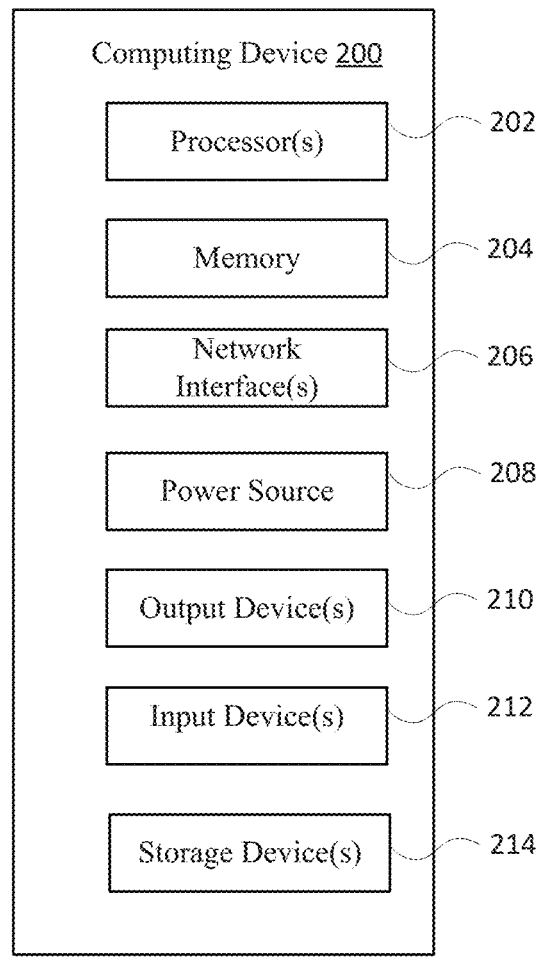
FIG. 2 is a block diagram illustrating components of a computing device according to some example embodiments.

FIG. 2 is a block diagram illustrating basic hardware components of a computing device 200 that may be used as the owner device 102, service device 104, vulnerability analytics server(s) 106, and/or assets 112, according to some example embodiments. Computing device 200 may include one or more processors 202, memory 204, network interfaces 206, power source 208, output devices 210, input devices 212, and storage devices 214. Although not explicitly shown in FIG. 2, each component provided is interconnected physically, communicatively, and/or operatively for inter-component communications in order to realize functionality ascribed to the one or more owner device 102, service device 104, vulnerability analytics server(s) 106, or assets 112. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the device 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within the device 200 during operation. In some embodiments, memory 204 includes a temporary memory that does not retain information stored when the device 200 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to the device 200 to gain access to processor 202.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The device 200 may comprise multiple network interfaces 206 to facilitate communication via multiple types of networks. Network interfaces 206 may comprise network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

Power source 208 provides power to the device 200. For example, the device 200 may be battery powered through rechargeable or non-rechargeable batteries utilizing nickel-cadmium or other suitable material. Power source 208 may include a regulator for regulating power from the power grid in the case of a device plugged into a wall outlet, and in some devices, power source 208 may utilize energy scavenging of ubiquitous radio frequency (RF) signals to provide power to the device 200.

The device 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the device 200.

The device 200 may also be equipped with one or more input devices 212. Input devices 212 are configured to receive input from a user or the environment where the device 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for the device 200 are functionally and communicatively coupled to achieve certain behaviors. In some embodiments, these behaviors are controlled by software running on an operating system of the device 200.

Figure 3:
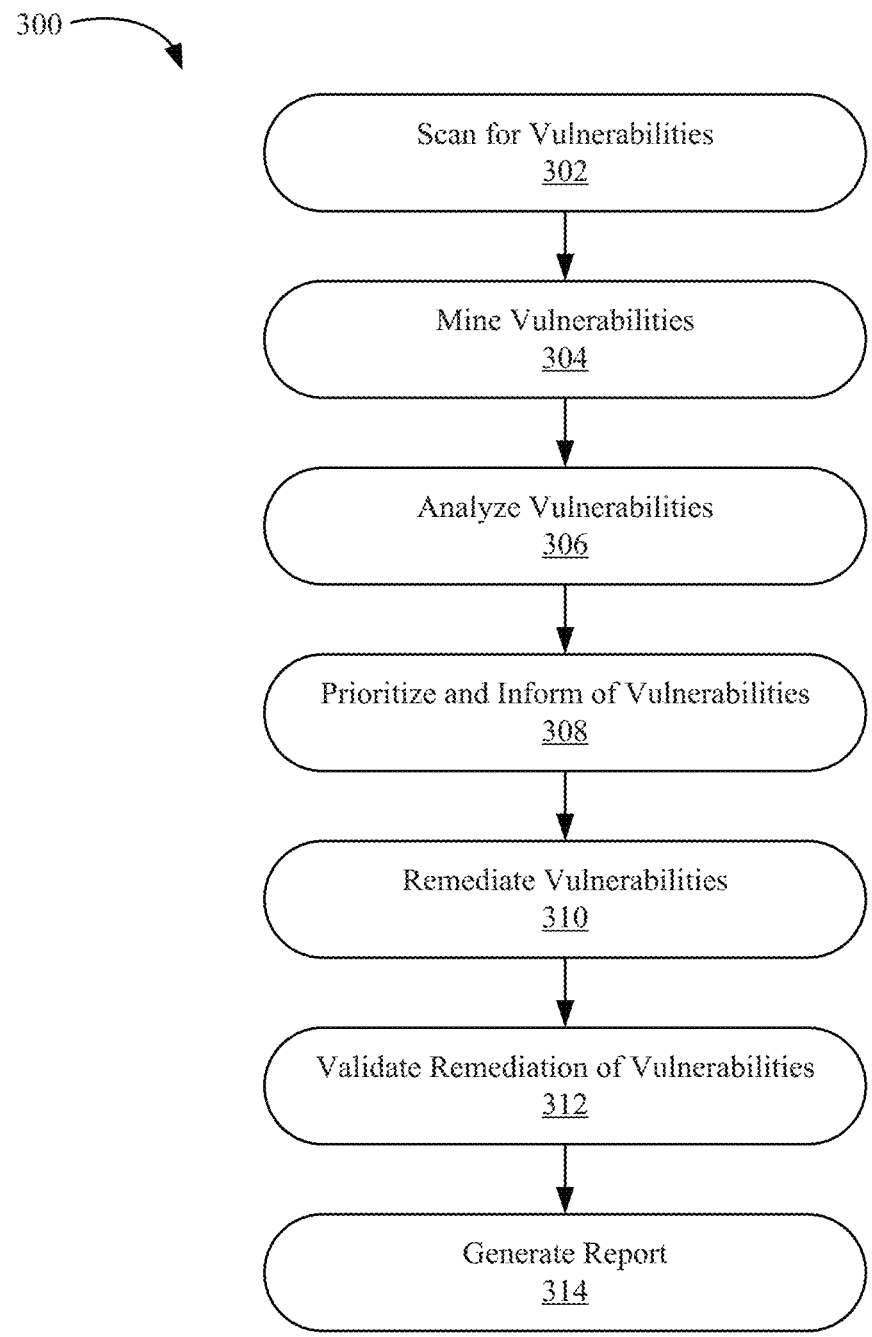
FIG. 3 is a flow diagram illustrating a process for vulnerability analysis according to an embodiment of the disclosure.

FIG. 3 is a flow diagram illustrating a process 300 for vulnerability analysis according to an embodiment of the disclosure. The process 300 may be performed by the vulnerability analytics server(s) 106 in concert with the vulnerability scanner 110. The process 300 contextualizes vulnerability raw data into information that can identify and prioritize vulnerability remediation. At step 302, the vulnerability scanner 110 scans the assets 112. During step 302, the vulnerabilities are catalogued as raw vulnerability data and sent to the vulnerability analytics server(s) 106. The raw vulnerability data includes a list of vulnerabilities, each vulnerability including at least a vulnerability identification (ID) and an asset identifier. The vulnerability ID identifies the vulnerability, and the asset identifier identifies the asset affected by the vulnerability. Asset identifier in the raw vulnerability data broadly refers to a hostname or address associated with a machine affected by the vulnerability.

At step 304, the vulnerability analytics server(s) 106 mines the raw vulnerability data. The vulnerability analytics server(s) 106 may compare the raw vulnerability data to asset inventory obtained from asset database 114. The vulnerability analytics server(s) 106 may merge the raw vulnerability data with the results of the comparison to the asset inventory to obtain contextual vulnerability data. The contextual vulnerability data may include raw vulnerability data linked with one or more of an asset value, an application, or an owner. An asset value is a value that identifies the asset associated with the vulnerability data. An asset may include an operating system, for example, Windows®, Linux, etc.; or, a platform, for example, network, hardware, etc.

At step 304, the vulnerability analytics server(s) 106 may further import control exceptions and system management automation tools from database 108 to perform further comparison. Control exceptions define, for example, vulnerabilities that may not be fixed at this point due to a manual exception being created. For example, an exception could be created where a vulnerability may not be fixed because a firewall already protects the asset from the vulnerability, thus, further resources need not go to fixing the asset. The system management automation tools provide further information on vulnerabilities, for example, vulnerabilities that are currently being worked on, vulnerabilities that have already been patched, vulnerabilities for which a patch has already been scheduled, and so on. The vulnerability analytics server(s) 106 may further update the contextual vulnerability data with information on control exceptions and system management automation, after the comparison. Assets may then be ranked by order of importance based on the contextual vulnerability data including asset values, application, owner, control exceptions, system mangament automation, and so on.

At step 306, the vulnerability analytics server(s) 106 may analyze vulnerabilities using the contextual vulnerability data. During analysis, the vulnerability analytics server(s) 106 may categorize the vulnerabilities into different groupings, for example, groupings based on duplicates, exceptions, being superseded, unfixed, patch in progress, application dependent, and so on.

At step 308, the vulnerability analytics server(s) 106 may prioritize and inform owner devices 102 and/or service devices 104 of vulnerabilities. The owner devices 102 and/or service devices 104 may be alerted through an email message, a text message, an alarm, and so on.

At step 310, the vulnerability analytics server(s) 106 may remediate the vulnerabilities by, for example, patching vulnerabilities with available patches. In some embodiments, other changes or settings that need to be applied are also applied during remediation. These may include updating registry keys, adjusting firewall settings, adjusting application settings, performing application uninstalls, performing application upgrades, and so on.

At step 312, the vulnerability analytics server(s) 106 validates the remediation of vulnerabilities performed in step 310. This step is similar to step 302, where a scan is performed on the vulnerabilities that were patched to determine whether those vulnerabilities have been fixed.

At step 314, the vulnerability analytics server(s) 106 generates a report for viewing on a display of a computing device, for example, a display of the owner device 102 or the service device 104.

Figure 4:
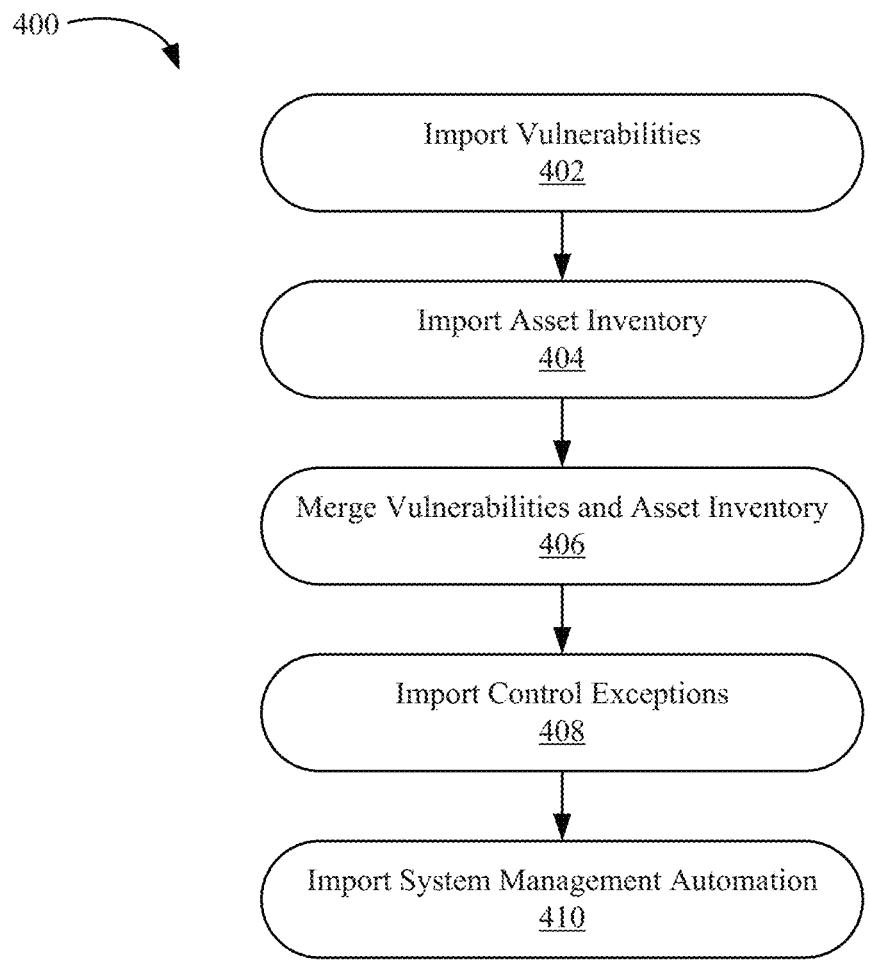
FIG. 4 is a flow diagram illustrating steps for mining vulnerabilities according to an embodiment of the disclosure.

FIG. 4 is a flow diagram illustrating a mining process 400 for mining vulnerabilities according to an embodiment of the disclosure. At step 402, the vulnerability analytics server(s) 106 imports vulnerabilities, for example, imports raw vulnerability data obtained from scan results of step 302 provided by the vulnerability scanner 110.

At step 404, the vulnerability analytics server(s) 106 imports asset inventory data from the asset database 114. The asset inventory data includes, for example, operating systems deployed, hardware configurations of computing devices and servers, applications installed on the computing devices and servers, and owners of assets within the asset inventory.

At step 406, the vulnerability analytics server(s) 106 merges the raw vulnerability data with the asset inventory data to obtain contextual vulnerability data. In one embodiment, each vulnerability data in the raw vulnerability data includes a vulnerability ID and an asset identifier; so, during the merging process, the vulnerability analytics server(s) 106 matches asset identifiers in the raw vulnerability data to asset values in the asset inventory. After matching an asset value with an asset identifier, the vulnerability analytics server(s) 106 merges other information associated with the asset value to the raw vulnerability data. For example, in the asset inventory, asset owners and applications may be identified, so the vulnerability analytics server(s) 106 merges asset owners and applications to the raw vulnerability data to obtain contextual vulnerability data. Raw vulnerability data includes an asset identifier, which is individual asset data that identifies where a vulnerability was found. These include, for example, a hostname of a device, a domain name server (DNS) name, or an internet protocol (IP) address. Raw vulnerability data may also include what type of vulnerability was detected on the individual asset. The individual asset data in the raw vulnerability data may be compared against asset inventory data in the asset inventory database 114. The asset inventory database 114 provides context for the role of the individual asset in the ecosystem. Raw vulnerability data identifies that a vulnerability was detected on a specific host, while, after performing the merging process, the contextual vulnerability data identifies that the specific host may be owned by a certain individual, that one or more applications running on the host may be affected by the vulnerability, that the host may have a certain role in the ecosystem, that the host may have a certain level of importance in the ecosystem, that a certain affected application may have a certain level of importance in the ecosystem, and so on.

At step 408, the vulnerability analytics server(s) 106 imports control exceptions data from database 108. Control exceptions data include vulnerabilities that are not to be fixed. For example, an asset may be protected by a firewall, so there may be no need to monitor or fix specific vulnerabilities that have threats which are diminished by the firewall. In another example, an owner or service member may place a manual exception on the asset for a specific vulnerability or classes of vulnerabilities, so the vulnerability analytics server(s) 106 does not monitor or fix these vulnerabilities.

At step 410, the vulnerability analytics server(s) 106 imports system management automation data from database 108. System management automation data includes information on vulnerabilities already being worked on, vulnerabilities already patched, and vulnerabilities scheduled to be patched.

Figure 5:
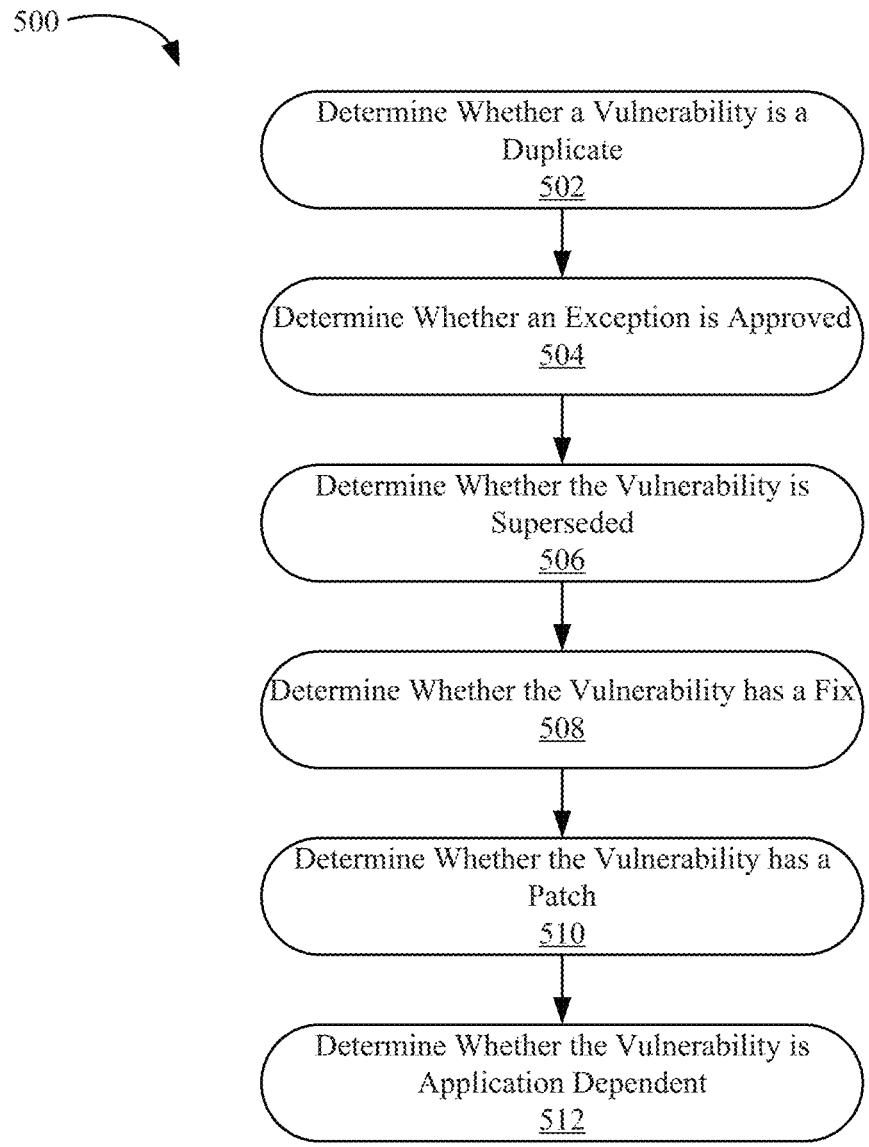
FIG. 5 is a flow diagram illustrating steps for processing vulnerabilities according to an embodiment of the disclosure.

FIG. 5 is a flow diagram 500 illustrating steps for processing vulnerabilities according to an embodiment of the disclosure. At step 502, the vulnerability analytics server(s) 106 determines whether a vulnerability within contextual vulnerability data is a duplicate. If the vulnerability is a duplicate, the vulnerability analytics server(s) 106 categorizes the vulnerability as a duplicate. In one embodiment, when a duplicate is detected, the duplicate is quarantined while the original is kept. Quarantined in the sense that when viewing in a user interface, the duplicate is not visible to the user, but the vulnerability analytics server(s) 106 has access to the duplicate.

At step 504, the vulnerability analytics server(s) 106 determines whether an exception is approved for the vulnerability. In one embodiment, using control exceptions data obtained at step 408, the vulnerability analytics server(s) 106 compares X of the vulnerability to the control exceptions data to determine whether X exists in the control exceptions data. X is used here as a property in the contextual vulnerability data and the control exceptions data. In some embodiments, when determining whether a vulnerability exists in the control exceptions data, the vulnerability ID is matched to a vulnerability ID in the control exceptions data. Once a match is found, the asset value is matched, then the owner is matched, then the application is matched. At each of these levels of granularity, the control exceptions data may include specific exceptions, for example, exceptions may exist for a specific vulnerability ID for all assets and for another vulnerability ID for only certain assets. If an exception is approved for the vulnerability, the vulnerability is categorized as exception approved.

At step 506, the vulnerability analytics server(s) 106 determines whether the vulnerability is superseded. The vulnerability analytics server(s) 106 determines from the system management automation data obtained from database 108 whether the vulnerability is superseded. As with using control exception data, the vulnerability analytics server(s) 106 compares properties in the system management automatiion data with properties in the contexual vulnerability data to identify whether the vulnerability is superseded. In one embodiment, the vulnerability may have a new version of a patch already released, but vendor information supersedes the new patch version, instructing the vulnerability analytics server(s) 106 to apply an older patch version or stay with an older patch version. If the vulnerability is determined to be superseded, the vulnerability is categorized as such.

At step 508, the vulnerability analytics server(s) 106 determines whether the vulnerability has a fix. The system automation data obtained from database 108 is used to determine whether the vulnerability has a fix, by comparing properties of entries in the system automation data that have fixes with properties of vulnerabilities in the contextual vulnerability data. If the vulnerability analytics server(s) 106 determines that a fix does not exist for the vulnerability, the vulnerability is categorized under a "No Fix" heading.

At step 510, similar to step 508, the vulnerability analytics server(s) 106 determines whether the vulnerability has a patch or solution already deployed using system automation data. If the vulnerability analytics server(s) 106 determines that a patch is in progress, the vulnerability is categorized under a "Patch in Progress" heading.

At step 512, the vulnerability analytics server(s) 106 determines whether the vulnerability is application-dependent. In one embodiment, the vulnerability analytics server(s) 106 determines from the contextual vulnerability data whether a specific vulnerability ID is paired with a specific application. If an application is identified, then the vulnerability analytics server(s) 106 classifies the vulnerability as application-dependent. In some embodiments, a rules engine is used to determine whether a vulnerability is application-dependent. If a contextualized vulnerability data includes metadata that has historically been marked as application-dependent, then the vulnerability analytics server(s) 106 classifies the vulnerability as application-dependent. In an example, an engineer sets a rule that automatically assigns a java finding in a contexualized vulnerability data as application-dependent. Thus, when the vulnerability analytics server(s) 106 comes across the java finding in the metadata, the vulnerability is assigned as application-dependent. In another example, the metadata is included in the vulnerability ID or a description of the vulnerability.

If the metadata does not exist, then the vulnerability will automatically be classified as an infrastructure finding or as being infrastructure-dependent. Any vulnerability that is an infrastructure finding may be resolved without coordination with specific applications affected by the vulnerability. For example, security patches may be applied to address the vulnerability without taking into account affected applications. Resolving an application-dependent vulnerability on the other hand may involve uninstalling application(s), upgrading application(s), or addressing dependencies within the application(s) that prevent a security patch from being applied.

Figure 6:
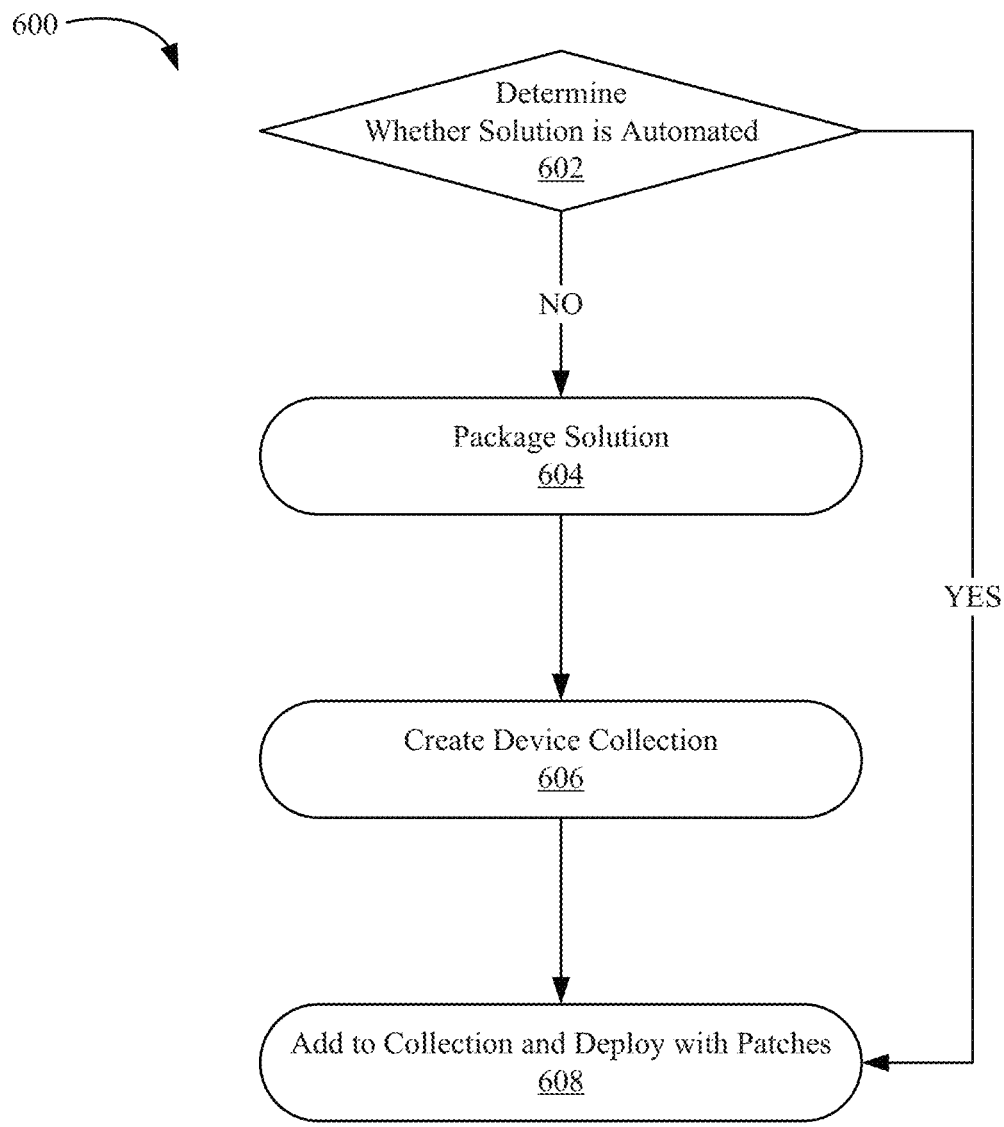
FIG. 6 is a flow diagram illustrating steps for remediating vulnerabilities according to an embodiment of the disclosure.

FIG. 6 is a flow diagram 600 illustrating steps for remediating vulnerabilities, according to an embodiment of the disclosure. At step 602, the vulnerability analytics server(s) 106 determines whether a solution to the vulnerability is automated. The vulnerability analytics server(s) 106 utilizes the categorizations at steps 508 and 510 to quickly identify whether the vulnerability has a fix and whether a patch is already deployed or is in the progress of being deployed. If the vulnerability has a fix and the patch is not already deployed, or is not in progress of being deployed, then the vulnerability analytics server(s) 106 adds the fix to a collection and deploys the fix with patches at step 608.

If the vulnerability does not have a fix or if the vulnerability has a fix but the fix or solution is not automated, then, at step 604, the solution is packaged by an application owner using an owner device 102 or by an administrator or service technician using a service device 104.

At step 606, a device collection is created, and the packaged solution is added to the device collection. A device collection is used here as an example, since applying patches to an ecosystem or computing infrastructure may be scheduled at specific times of the day. Adding solutions to a collection for specific devices enables applying the solutions in the collection at a scheduled time in batches.

Figure 7:
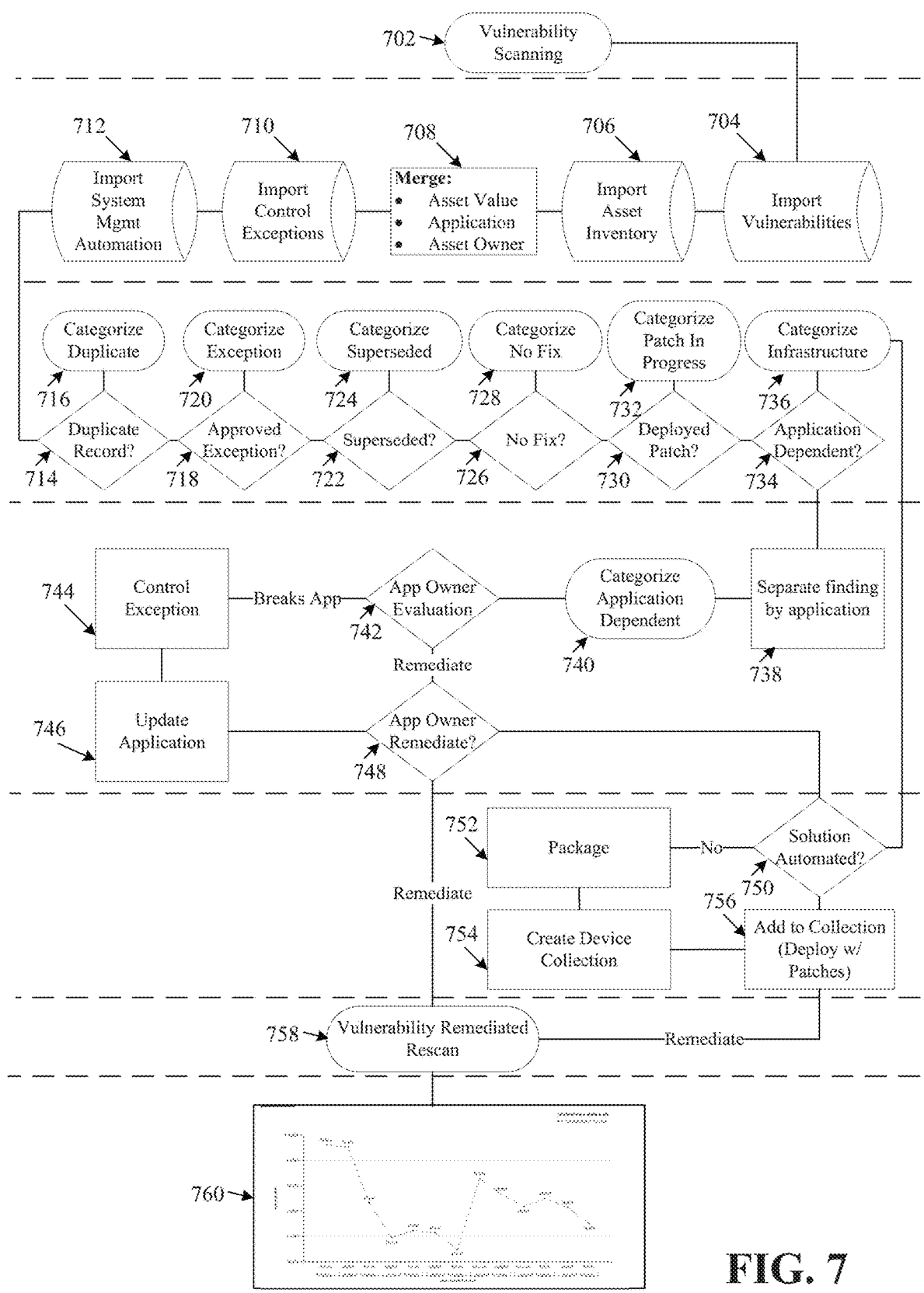
FIG. 7 illustrates an example flow diagram showing steps for vulnerability analysis according to an embodiment of the disclosure.

FIG. 7 illustrates an example flow diagram showing steps for vulnerability analysis according to an embodiment of the disclosure. The discover grouping shown in FIG. 7 is analogous to the scanning step in step 302. At step 702, the vulnerability scanner 110 performs vulnerability scanning of the assets 112.

The mine grouping includes steps similar to those described in FIG. 4. At step 704, the vulnerability analytics server(s) 106 imports vulnerabilities from the vulnerability scanner 110 as raw vulnerability data. At step 706, the vulnerability analytics server(s) 106 imports asset inventory from the asset database 114. At step 708, the vulnerability analytics server(s) 106 merges the raw vulnerability data and the imported data from the asset inventory to create contextual vulnerability data. At steps 710 and 712, control exceptions data and system management automation data are imported by the vulnerability analytics server(s) 106.

The analyze grouping includes steps similar to those described in FIG. 5. Each step of the analyze grouping is performed by the vulnerability analytics server(s) 106. At step 714, vulnerabilities in the contextual vulnerability data are compared to determine whether they are duplicates, and if a vulnerability is found to be a duplicate, then the vulnerability is categorized as being a duplicate at step 716. At step 718, vulnerabilities in the contextual vulnerability data are compared to determine whether exceptions are approved, and if an exception is approved for a vulnerability, then the vulnerability is categorized under exception at step 720. At step 722, vulnerabilities in the contextual vulnerability data are compared to determine whether they are superseded, and if a vulnerability is found to be superseded, then the vulnerability is categorized as being superseded at step 724. At step 726, vulnerabilities in the contextual vulnerability data are compared to determine whether a fix exists, and if no fix exists for a vulnerability, then the vulnerability is categorized as "No Fix" at step 728. At step 730, vulnerabilities in the contextual vulnerability data are compared to determine whether a patch has been deployed, and if a vulnerability is found to have already been patched, then the vulnerability is categorized as having a patch in progress at step 732. At step 734, vulnerabilities in the contextual vulnerability data are compared to determine whether the vulnerabilities are application dependent, and if a vulnerability is not application-dependent, then the vulnerability is categorized as infrastructure at step 736.

Under the prioritize grouping, if a vulnerability is application-dependent, then the vulnerability is separated by application at step 738 and categorized as application-dependent at step 740. The categorization of the vulnerability as application-dependent at step 740 may involve contacting application owners of all applications affected by the specific vulnerability. The message to the owner may include information or data on the vulnerability and on solutions recommended to fix the vulnerability. At step 742, an owner may decide to have the vulnerability go through a remediation process at step 748, or the owner may discover that a solution breaks the application susceptible to the vulnerability and creates a control exception at step 744, or the owner may manually update the application at step 746.

Step 748 involves deciding whether the remediation process is guided by the owner or whether the remediation process is automated. If automated, then at step 750, the solution to the vulnerability signals that a fix/patch exists and at step 756, the fix/patch is added to a collection and deployed. If at step 750, the solution to the vulnerability is not automated, then a package is created for the solution at step 752, and the package is added to a device collection at step 754 before being deployed with patches at step 756.

After remediation, the vulnerability scanner 110 rescans the remediated assets at step 758. At step 760, the vulnerability analytics server(s) 106 generates reports, for examples, graphs and tables, for user consumption.

Figure 8:
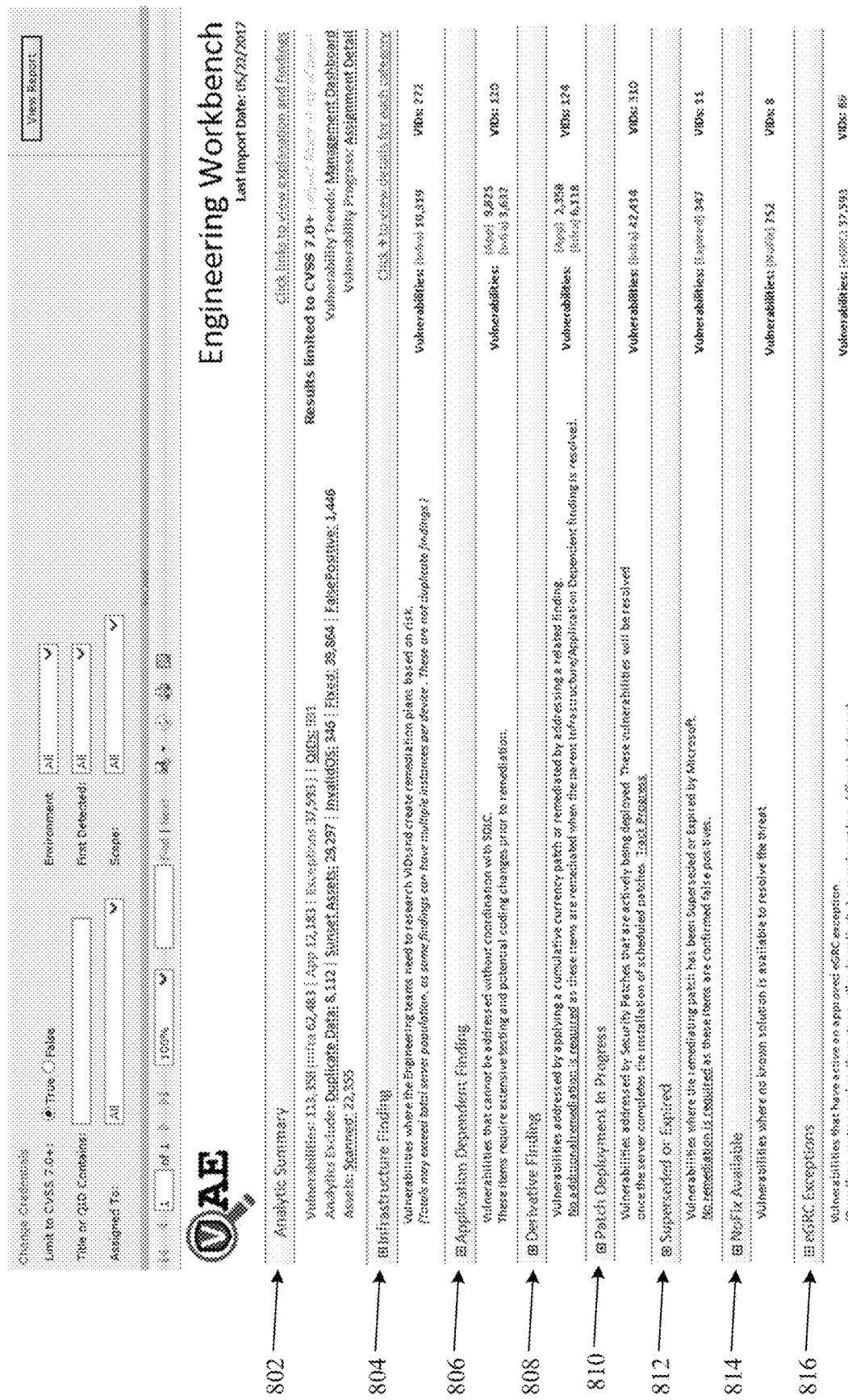
FIG. 8 is an example report displayed on a screen of a computing device according to an embodiment of the disclosure.
Figure 9:
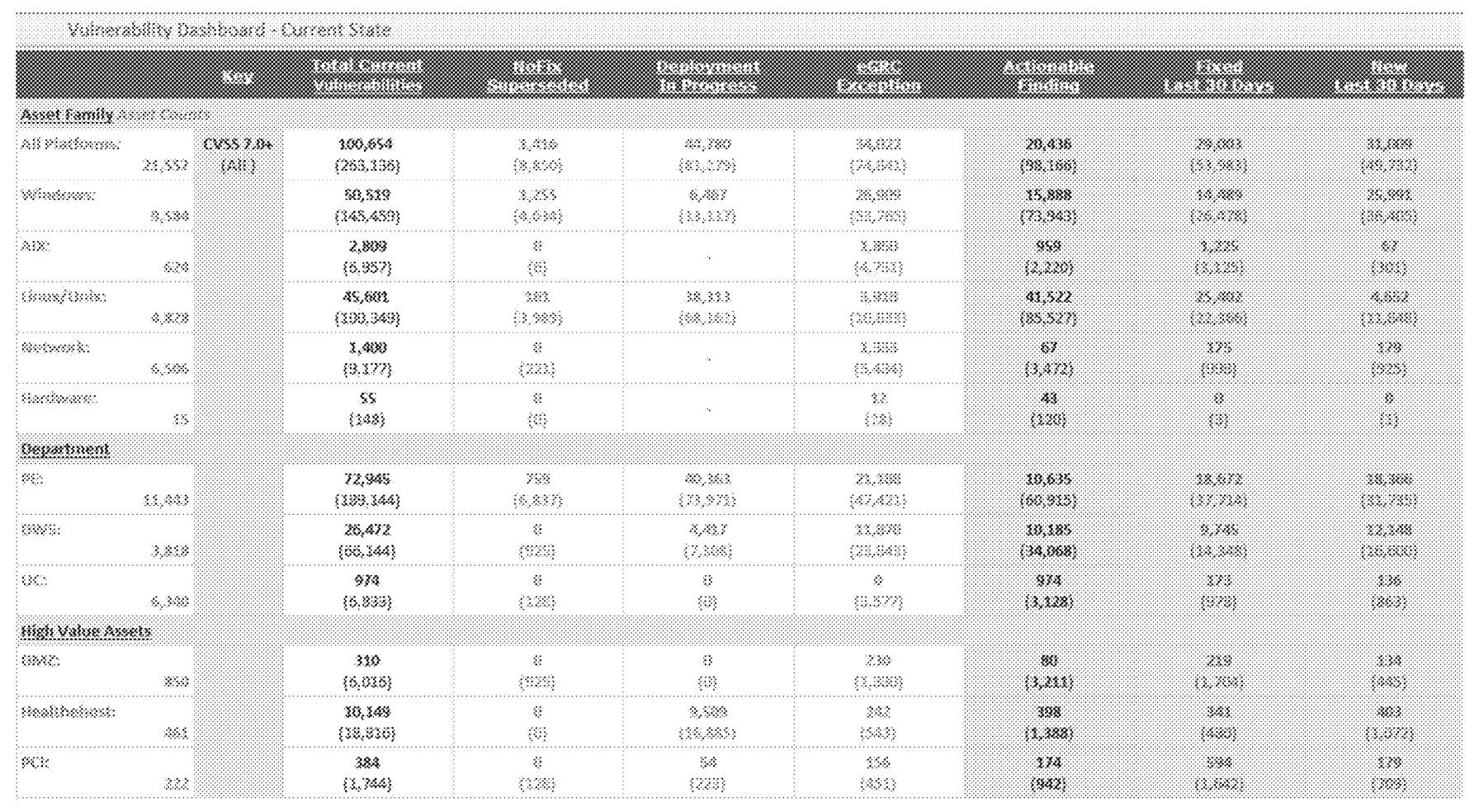
Figure 10:
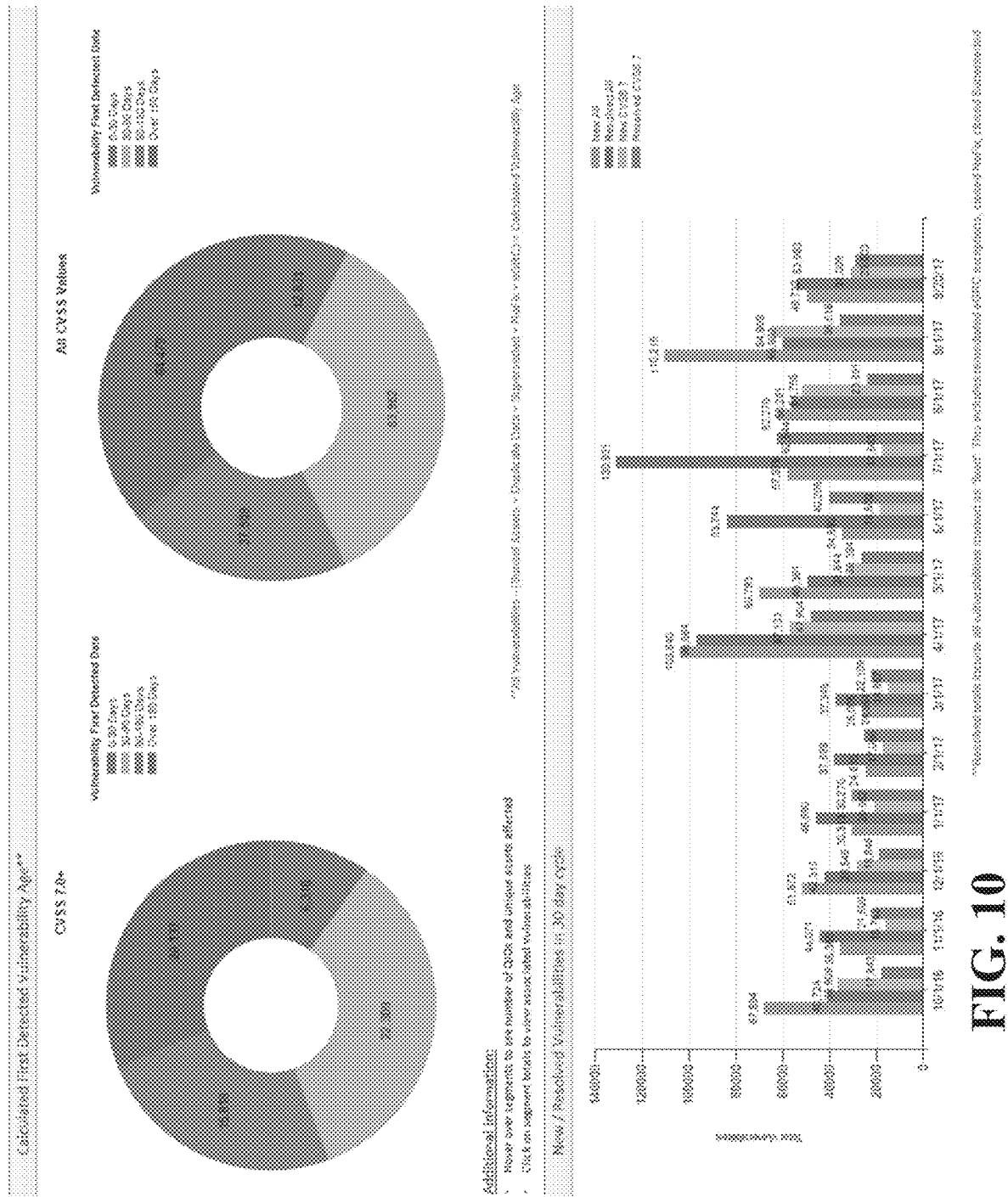
FIG. 10 is yet another example report displayed on a screen of a computing device according to an embodiment of the disclosure.

FIGS. 8-10 illustrate example reports displayed on a screen of a computing device according to some embodiments of the disclosure. In FIG. 8, a report may be generated by the vulnerability analytics server(s) 106 that shows an overall summary 802, infrastructure finding summary 804, application-dependent finding summary 806, derivative finding summary 808, patch deployment in progress summary 810, suppressed or expired summary 812, no fix available summary 814, and exceptions summary 816. The overall summary 802 includes total vulnerabilities and may list total number of vulnerabilities in infrastructure, application, and/or exceptions. The overall summary 802 may also list total number of duplicate vulnerabilities, sunset assets, invalid operating system, fixed vulnerabilities, and false positives. The overall summary 802 may further include total number of assets scanned. In a computing infrastructure, as assets go offline, for example, when a desktop computer is removed from the network and replaced with another desktop computer, vulnerabilities associated with the removed desktop computer still exist in the database(s) 108. Since the removed desktop computer will no longer be part of the computing infrastructure, vulnerabilities associated with the removed desktop computer may be identified, removed, or categorized as non-essential or non-important. The removed desktop computer is an example of a sunset asset, that is, an asset that was previously part of the computing infrastructure or computing ecosystem but is no longer part of that ecosystem. In some embodiments, the vulnerability scanner 110 determines that an asset is a sunset asset when the asset has been offline for a predetermined duration. For example, an asset that has been offline for 30 days is deemed a sunset asset. In some embodiments, the vulnerability analytics server(s) 106 determines that an asset associated with a vulnerability is a sunset asset when the asset is not found in the asset database 114.

The infrastructure finding summary 804 may include vulnerabilities where engineering teams may research vulnerability IDs and create remediation plans based on risk. The application-dependent finding summary 806 may include vulnerabilities that cannot be addressed without coordination with a software deployment life cycle (SDLC). Vulnerabilities classified under application-dependent findings may require extensive testing and potential coding changes prior to remediation. The derivative finding summary 808 includes vulnerabilities addressed by applying a cumulative currency patch or remediated by addressing a related finding. Vulnerabilities under derivative findings do not require additional remediation, since they are automatically remediated when the parent infrastructure/application-dependent finding is resolved. The patch deployment in progress summary 810 may include vulnerabilities addressed by security patches that are actively being deployed. Vulnerabilities under patch deployment in progress are resolved once scheduled patches are installed. In some embodiments, a link to track progress of the installation of the scheduled patches is provided. The superseded or expired summary 812 includes vulnerabilities where remediated patches are superseded or expired by a vendor. Vulnerabilities in this category do not require remediation and may be confirmed as false positives. The no fix available summary 814 includes vulnerabilities where no known solution is availabe to resolve the threats. The exceptions summary 816 includes vulnerabilities that have active and approved exceptions. In some embodiments, once an excpetion is no longer active or an exception expires, the vulnerabilities affected by the expiration are re-categorized.

FIG. 9 shows another report that may be generated. In FIG. 9, a tabular report including columns showing total number of current vulnerabilities, vulnerabilities without fixes, superseded vulnerabilities, vulnerabilities with patch deployment in progress, vulnerabilities under exception, vulnerabilities with actionable finding, vulnerabilities fixed or vulnerabilties fixed during a specified time period, and new vulnerabilities found or new vulnerabilities found within a specified time period. These total number of vulnerabilities in each category may be grouped by asset family, department, or high value assets. Asset family includes, for example, operating system, network, hardware, etc. Department may include different departments within an organization. Additionally, an organization may identify certain assets as high value and may choose to monitor vulnerabilities in these assets. Actionable findings are infrastructure-dependent and application-dependent findings that are not currently being resolved or covered by an exception. Actionable findings may be reviewed by an administrator or application owner.

FIG. 10 shows graphical reports that may be generated in contrast to the tabular report of FIG. 9. In FIG. 10, vulnerabilities may be binned depending on the date the vulnerability was first detected. Vulnerabilities may be binned in several categories, for example, vulnerabilities detected between 0-30 days, 30-90 days, 90-180 days, and over 180 days. The number of vulnerabilities for each of these categories may be provided in a pie chart, as shown in FIG. 10. Bar charts may also be used, as shown in FIG. 10, to display the number of vulnerabilities on a monthly basis (or some other time interval). In some embodiments, for each time interval, multiple bars may be used to identify new vulnerabilities and resolved vulnerabilities.

FIG. 10 also shows statistics for vulnerabilities with CVSS greater than or equal to 7 and vulnerabilities with all CVSS values. CVSS stands for common vulnerability scoring system, and the greater the CVSS value, the greater the severity of the threat associated with the vulnerability. CVSS ranges from 0 to 10, and in the embodiment of FIG. 10, vulnerabilities with a CVSS 7 and above are treated as a higher priority, and a graphic depicting a status of the vulnerabilities with a 7+ score is provided. In some embodiments, when prioritizing findings to display to a user, vulnerabilities with higher CVSS values are displayed first. CVSS here is used as an example, but other scoring systems may be used. The use of 7 as a threshold for severe threats is also an example, but other threat thresholds may be used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for contextualizing vulnerabilities, the method performed by a server including a processor and a non-transitory computer readable medium with computer-executable instructions stored thereon, such that when the instructions are executed by the processor, the server performs the method comprising:
   importing raw vulnerability data from a vulnerability scanner, the raw vulnerability data including one or more vulnerability data wherein each vulnerability data includes a vulnerability identification (ID) and an asset value;
   importing an asset inventory from an asset database;
   merging the asset inventory and the raw vulnerability data to obtain contextual vulnerability data, the contextual vulnerability data including one or more vulnerability data linked to a vulnerability ID, an asset value, and an asset owner;
   categorizing the contextual vulnerability data; and
   generating a report of the categorized contextual vulnerability data, wherein categorizing the contextual vulnerability data includes at least one of,
   determining whether a vulnerability is a duplicate, and in response to the vulnerability being a duplicate, categorizing the vulnerability as duplicate;
   determining whether an exception is approved for the vulnerability, and in response to the exception being approved, categorizing the vulnerability as exception;
   determining whether the vulnerability is superseded, and in response to the vulnerability being superseded, categorizing the vulnerability as superseded;
   determining whether the vulnerability has a fix, and in response to the vulnerability not having a fix, categorizing the vulnerability as not having a fix;
   determining whether the vulnerability is a patch, and in response to the vulnerability having a patch, categorizing the vulnerability as the patch in progress; and
   determining whether the vulnerability is application dependent, in response to the vulnerability being application dependent, categorizing the vulnerability as application dependent, and in response to the vulnerability being application independent, categorizing the vulnerability as infrastructure.

2. The method according to claim 1, wherein the vulnerability is categorized as the exception when threats associated with the vulnerability are diminished by a firewall.

3. The method according to claim 1, wherein the vulnerability is categorized as the exception when a vulnerability ID of the vulnerability is identified in control exception data.

4. The method according to claim 1, wherein an asset is selected from the group consisting of: an operating system, a computing hardware, a network, and an application.

5. The method according to claim 1, wherein generating a report of the categorized contextual vulnerability data includes generating a table including vulnerabilities separated into categories determined by the categorizing step, the categories including an infrastructure finding summary category, an application dependent finding category, and an exception summary category.

6. The method according to claim 5, wherein the categories further include a vulnerabilities summary category including vulnerability totals from other categories.

7. The method according to claim 1, wherein generating a report of the categorized contextual vulnerability data includes generating a table including vulnerabilities by groupings, the groupings including asset family, department, and high value assets.

8. The method according to claim 1, wherein generating a report of the categorized contextual vulnerability data includes generating a pie chart, the pie chart including the contextual vulnerabilities categorized by how long each vulnerability in the contextual vulnerability was first detected.

9. A server for contextualizing vulnerabilities, the server including a processor and a non-transitory computer readable medium containing instructions stored thereon, such that when the instructions are executed by the processor, the server performs the method comprising:
   importing raw vulnerability data from a vulnerability scanner, the raw vulnerability data including one or more vulnerability data wherein each vulnerability data includes a vulnerability identification (ID) and an asset value;
   importing an asset inventory from an asset database;
   merging the asset inventory and the raw vulnerability data to obtain contextual vulnerability data, the contextual vulnerability data including one or more vulnerability data linked to a vulnerability ID, an asset value, and an asset owner;
   categorizing the contextual vulnerability data; and
   generating a report of the categorized contextual vulnerability data, wherein categorizing the contextual vulnerability data includes at least one of,
   determining whether a vulnerability is a duplicate, and in response to the vulnerability being a duplicate, categorizing the vulnerability as duplicate;
   determining whether an exception is approved for the vulnerability, and in response to the exception being approved, categorizing the vulnerability as exception;
   determining whether the vulnerability is superseded, and in response to the vulnerability being superseded, categorizing the vulnerability as superseded;
   determining whether the vulnerability has a fix, and in response to the vulnerability not having a fix, categorizing the vulnerability as not having a fix;
   determining whether the vulnerability is a patch, and in response to the vulnerability having a patch, categorizing the vulnerability as the patch in progress; and
   determining whether the vulnerability is application dependent, in response to the vulnerability being application dependent, categorizing the vulnerability as application dependent, and in response to the vulnerability being application independent, categorizing the vulnerability as infrastructure.

10. The server according to claim 9, wherein the vulnerability is categorized as the exception when threats associated with the vulnerability are diminished by a firewall.

11. The server according to claim 9, wherein the vulnerability is categorized as the exception when a vulnerability ID of the vulnerability is identified in control exception data.

12. The server according to claim 9, wherein an asset is selected from the group consisting of: an operating system, a computing hardware, a network, and an application.

13. The server according to claim 9, wherein generating a report of the categorized contextual vulnerability data includes generating a table including vulnerabilities separated into categories determined by the categorizing step, the categories including an infrastructure finding summary category, an application dependent finding category, and an exception summary category.

14. The server according to claim 13, wherein the categories further include a vulnerabilities summary category including vulnerability totals from other categories.

15. The server according to claim 9, wherein generating a report of the categorized contextual vulnerability data includes generating a table including vulnerabilities by groupings, the groupings including asset family, department, and high value assets.

16. The server according to claim 9, wherein generating a report of the categorized contextual vulnerability data includes generating a pie chart, the pie chart including the contextual vulnerabilities categorized by how long each vulnerability in the contextual vulnerability was first detected.

17. A computing device for displaying contextualized vulnerabilities, the computing device including a screen, a processor and a non-transitory computer readable medium containing instructions stored thereon, such that when the instructions are executed by the processor, the computing device performs the method comprising:
receiving, from a server, a message containing one or more vulnerability data and one or more solutions to the vulnerability data, each vulnerability data including a vulnerability identification (ID) and an asset value identifying an application;
determining whether a first one of the solutions for a corresponding vulnerability in the vulnerability data causes the application identified in the asset value of the corresponding vulnerability to break;
based on determining that the application breaks, generating an exception for the corresponding vulnerability and providing the exception to the server;
based on determining that the application does not break, applying the first solution to the application to patch the corresponding vulnerability;
receiving, from the server, a report of categorized contextual vulnerability data including the corresponding vulnerability being categorized in an exception category or in a fixed category; and
displaying the report on the screen, wherein the categorized contextual vulnerability data includes at least one of,
determining whether a vulnerability is a duplicate, and in response to the vulnerability being a duplicate, categorizing the vulnerability as duplicate;
determining whether an exception is approved for the vulnerability, and in response to the exception being approved, categorizing the vulnerability as exception;
determining whether the vulnerability is superseded, and in response to the vulnerability being superseded, categorizing the vulnerability as superseded;
determining whether the vulnerability has a fix, and in response to the vulnerability not having a fix, categorizing the vulnerability as not having a fix;
determining whether the vulnerability is a patch, and in response to the vulnerability having a patch, categorizing the vulnerability as the patch in progress; and
determining whether the vulnerability is application dependent, in response to the vulnerability being application dependent, categorizing the vulnerability as application dependent, and in response to the vulnerability being application independent, categorizing the vulnerability as infrastructure.

18. The computing device according to claim 17, wherein the report includes a bar graph of the categorized contextual vulnerability data, the bar graph showing the corresponding vulnerability as being resolved on a specific date.

* * * * *